United States Patent
Hansen et al.

[11] Patent Number: 5,251,747
[45] Date of Patent: Oct. 12, 1993

[54] STORAGE ASSEMBLAGE FOR INDEX PRINT SHEETS AND CASSETTES

[75] Inventors: David E. Hansen, Fairport; Joel S. Lawther; Robert J. Blackman, both of Rochester, all of N.Y.

[73] Assignee: Eastman Kodak Company, Rochester, N.Y.

[21] Appl. No.: 3,363

[22] Filed: Jan. 12, 1993

[51] Int. Cl.$^5$ ............................................. B65D 85/672
[52] U.S. Cl. .................................... 206/232; 206/225; 206/391; 206/408; 206/450; 206/455; 206/472
[58] Field of Search ................... 40/124, 124.1, 124.2, 40/124.4, 152, 152.1, 154, 156, 157, 158.1, 159, 159.2; 206/0.8, 0.81-0.84, 45.34, 216, 223, 225, 232, 233, 387, 389, 391, 409, 425, 444, 461-483, 457, 459.5, 559-565, 581, 578, 408, 449, 450, 454-456; 242/71, 71.1, 71.7; 281/21, 22, 26, 28, 31, 51; 434/429

[56] References Cited

U.S. PATENT DOCUMENTS

| | | | |
|---|---|---|---|
| 3,685,857 | 8/1972 | Schlieben | 281/26 |
| 3,708,061 | 1/1973 | Weingarden et al. | 206/45.34 |
| 4,629,067 | 12/1986 | Pavlik et al. | 206/425 |
| 4,684,019 | 8/1987 | Egly | 206/444 |
| 4,832,208 | 5/1989 | Finnegan | 211/73 |
| 4,936,462 | 6/1990 | Yuen | 206/542 |
| 4,965,948 | 10/1990 | Ruebens | 40/159 |
| 4,995,508 | 2/1991 | Burley | 206/44 |
| 5,161,907 | 11/1992 | Byrne | 206/455 |

Primary Examiner—Jimmy G. Foster
Attorney, Agent, or Firm—Roger A. Fields

[57] ABSTRACT

A storage assemblage is disclosed for cassettes each of which holds an image bearing medium having recorded images and for index print sheets each of which has printed pictures that match the images on the image bearing medium in one of the cassettes. According to the invention, the storage assemblage comprises display containers each of which includes a flat transparent cover and a flat back dimensioned to snugly hold an index print sheet between them with the pictures on the index print sheet visible through the cover. The back has a nest open at an inner side of the back to receive a cassette and projecting from an outer side of the back to hold the cassette out of the way of the index print sheet. A storage box has at least two substantially parallel grooves each of which is configured to receive some of the nests of the respective containers in a line to arrange the covers and backs of the containers whose nests are in the same groove overlapping in an X-direction and to arrange the covers and backs of the containers whose nests are in different grooves overlapping in a Y-direction substantially perpendicular to the X direction, to provide a compact storage facility.

3 Claims, 4 Drawing Sheets

STORAGE ASSEMBLAGE FOR INDEX PRINT SHEETS AND CASSETTES

CROSS-REFERENCE TO RELATED APPLICATIONS

Reference is made to commonly assigned copending applications Ser. No. 08/003,364, entitled CONTAINER FOR INDEX PRINT SHEET AND CASSETTE, and filed Jan. 12, 1992 in the name of R. J. Blackman, and Ser. No. 08/003,171, entitled STORAGE ASSEMBLAGE FOR INDEX PRINT SHEETS AND CASSETTES and filed Jan. 12, 1992 in the names of R. J. Blackman and D. E. Hansen.

BACKGROUND OF THE INVENTION

1. Field of the Invention

The invention relates to a storage assemblage for cassettes each of which holds an image bearing medium having recorded images and for index print sheets each of which has printed pictures that match the images on the image bearing medium.

2. Description of the Prior Art

Generally, a processing laboratory gives the customer a processed photographic negative film and photographs which are enlarged and printed from the film. The negative film is usually cut into several sections, each one containing the same number of negatives and inserted in an open-ended sheath or sleeve. Many customers store the photographs in an envelope (with the negatives), making it difficult to later find a particular photograph.

Index or contact print sheets have been proposed which make it easier to find a particular negative. An index print sheet has printed on it several rows of pictures that match the negatives. The pictures are numbered in accordance with numbering of the negatives.

A book-like container for the index print sheet, the negatives, and individual prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the index print sheet along a mid-line. This flexing can possibly damage the index print sheet. The cassette is stored in an interior pocket raised from the base. This arrangement makes the container rather bulky.

THE CROSS-REFERENCED APPLICATIONS

Cross-referenced application Ser. No. 08/003,364 discloses a container for a cassette which holds an image bearing medium having recorded images and for an index print sheet which has printed pictures that match the plurality of images on the image bearing medium. The container comprises a transparent sheet-like cover having a length and width slightly larger than corresponding dimensions of the index print sheet to closely overlay the index print sheet, and a sheet-like back having a length and width similar to the length and width of the cover to store the index print snugly between the cover and the back with the plurality of pictures on the index print sheet visible through the cover. The back includes an integrally formed nest blown outward to hold the cassette out of the way of the index print sheet.

Cross-referenced application Ser. No. 09/003,171 discloses a storage assemblage comprising one or more containers each of which includes a flat transparent cover and a flat back dimensioned to snugly hold an index print sheet between them with the pictures on the index print sheet visible through the cover. The back has a fulcrum extension projecting from one edge of the back, and a nest open at an inner side of the back to receive a cassette and which projects from an outer side of the back to hold the cassette out of the way of the index print sheet. A box has a support for the back of each container, a groove arranged to receive the nest of each container when the back of the container is laid against the support, and slot-like means adapted to receive the fulcrum of each container to support the container for pivoting about its fulcrum to lower its back onto the support and its nest into the groove.

SUMMARY OF THE INVENTION

A storage assemblage is intended for cassettes each of which holds an image bearing medium having recorded images and for index print sheets each of which has printed pictures that match the images on the image bearing medium in one of the cassettes. According to the invention, the storage assemblage comprises display containers each of which includes a flat transparent cover and a flat back dimensioned to snugly hold an index print sheet between them with the pictures on the index print sheet visible through the cover. The back has a nest open at an inner side of the back to receive a cassette and projecting from an outer side of the back to hold the cassette out of the way of the index print sheet. A storage box has at least two substantially parallel grooves each of which is configured to receive some of the nests of the respective containers in a line to arrange the covers and backs of the containers whose nests are in the same groove overlapping in an X-direction and to arrange the covers and backs of the containers whose nests are in different grooves overlapping in a Y-direction substantially perpendicular to the X direction, to provide a compact storage facility.

DETAILED DESCRIPTION OF THE PREFERRED EMBODIMENT

Figure 1:
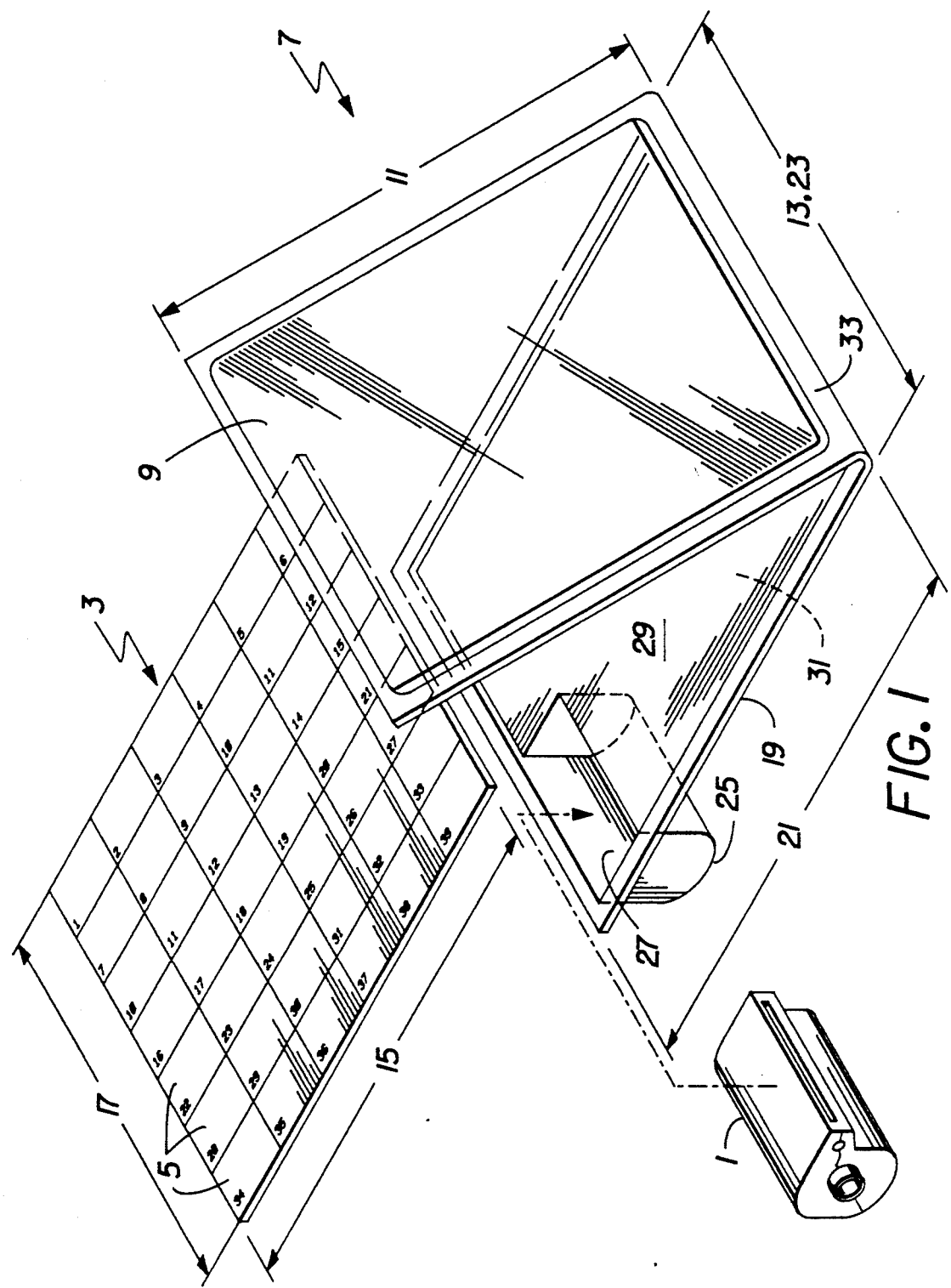
FIG. 1 is a perspective view of a display container according to a preferred embodiment of the invention, showing how the container is opened to receive a cassette and an index print sheet.
Figure 2:
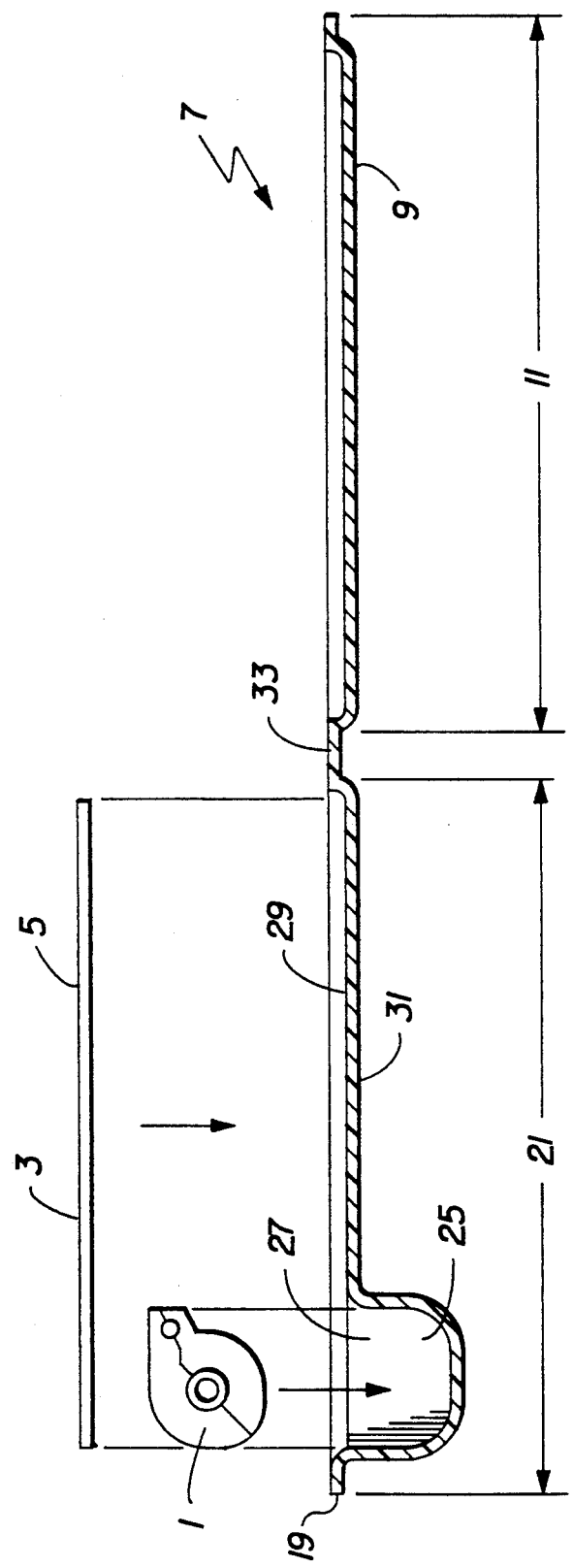
FIG. 2 is a sectional view of the display container with the cassette and the index print sheet.

Referring to FIGS. 1 and 2, a 35 mm film cassette 1 is shown similar to the one disclosed in commonly assigned copending application Ser. No. 07/793,980 entitled FILM CASSETTE HAVING SPOOL CORE WITH FASTENING HOOK and filed Nov. 18, 1991 in the names of D. R. Zander and C. M. Csaszar. The cassette 1 holds a rolled filmstrip, not shown, having a series of successively numbered negatives.

An index print sheet 3 similar to the one disclosed in U.S. Pat. No. 4,966,285, issued Oct. 30, 1990, has a series of pictures 5 printed on it that match the negatives on the filmstrip inside the cassette 1. The pictures 5 are numbered in accordance with numbering of the negatives.

A display container 7 for the cassette 1 and the index print sheet 3 consists of a single piece of transparent molded thin plastic. A sheet-like cover or lid 9 of the container 7 has a length 11 and a width 13 slightly larger than corresponding dimensions 15 and 17 of the index print sheet 3 to closely overlay the index print sheet. See FIGS. 1 and 2. A sheet-like back or base 19 of the container 7 has a length 21 and a width 23 similar to the length 11 and the width 13 of the cover 9 to store the index print sheet 3 snugly between the cover and the back with the series of pictures 5 on the index print sheet visible only through the cover. The back 19 includes an integrally formed nest or receptacle 25 having an access opening 27 at an inner side 29 of the back to receive the cassette 1 and projecting outward from an outer side 31 of the back to hold the cassette 1 out of the way of the index print sheet 3. A "living" hinge 33 connects the cover 9 and the back 19 to swing the cover away from the back to open and close the container 7. Known means, not shown, releasably secure the cover 9 and the back 19 to prevent the container 7 from being accidentally opened.

Figure 3:
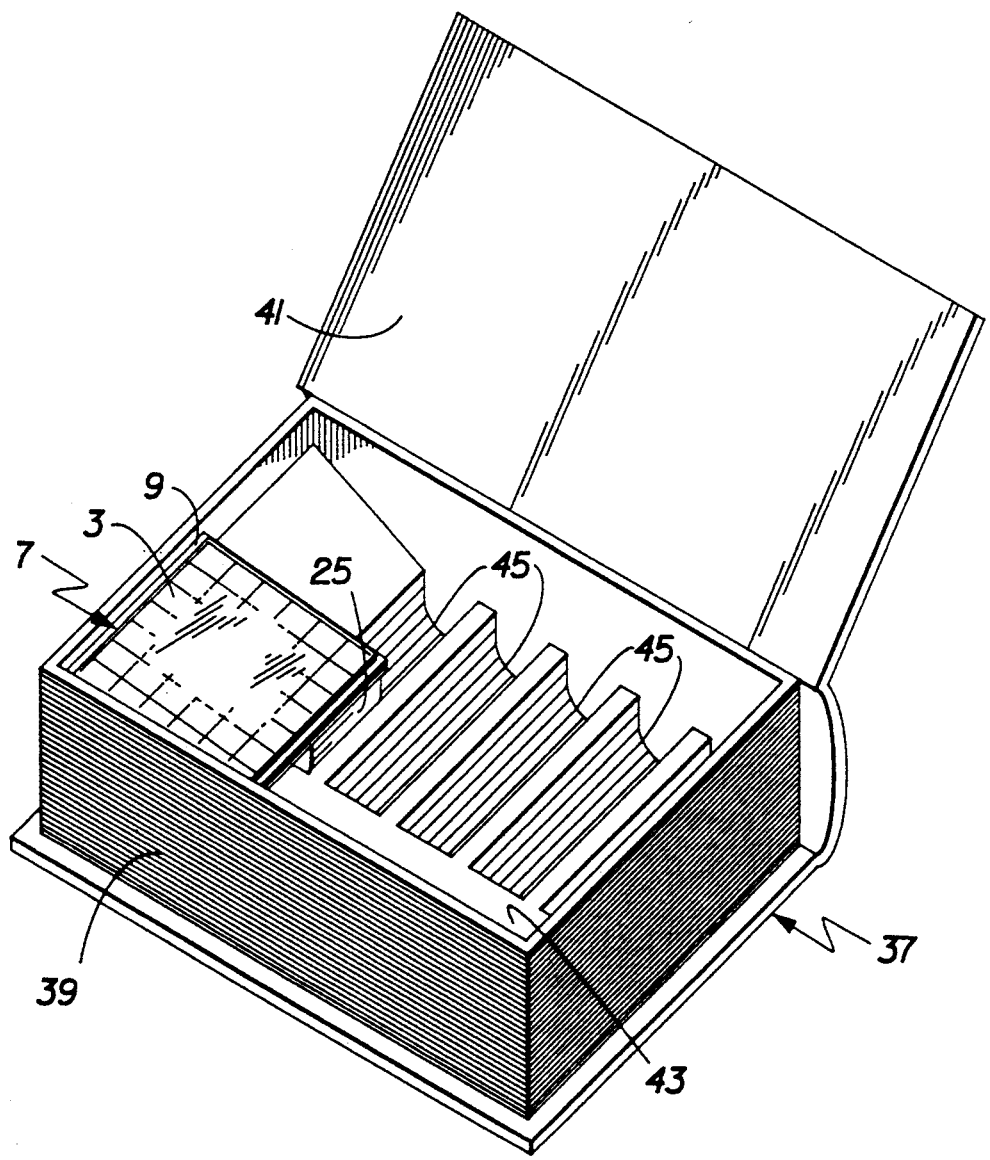
FIG. 3 is a perspective view of a storage box for the display container according to the preferred embodiment of the invention.
Figure 4:
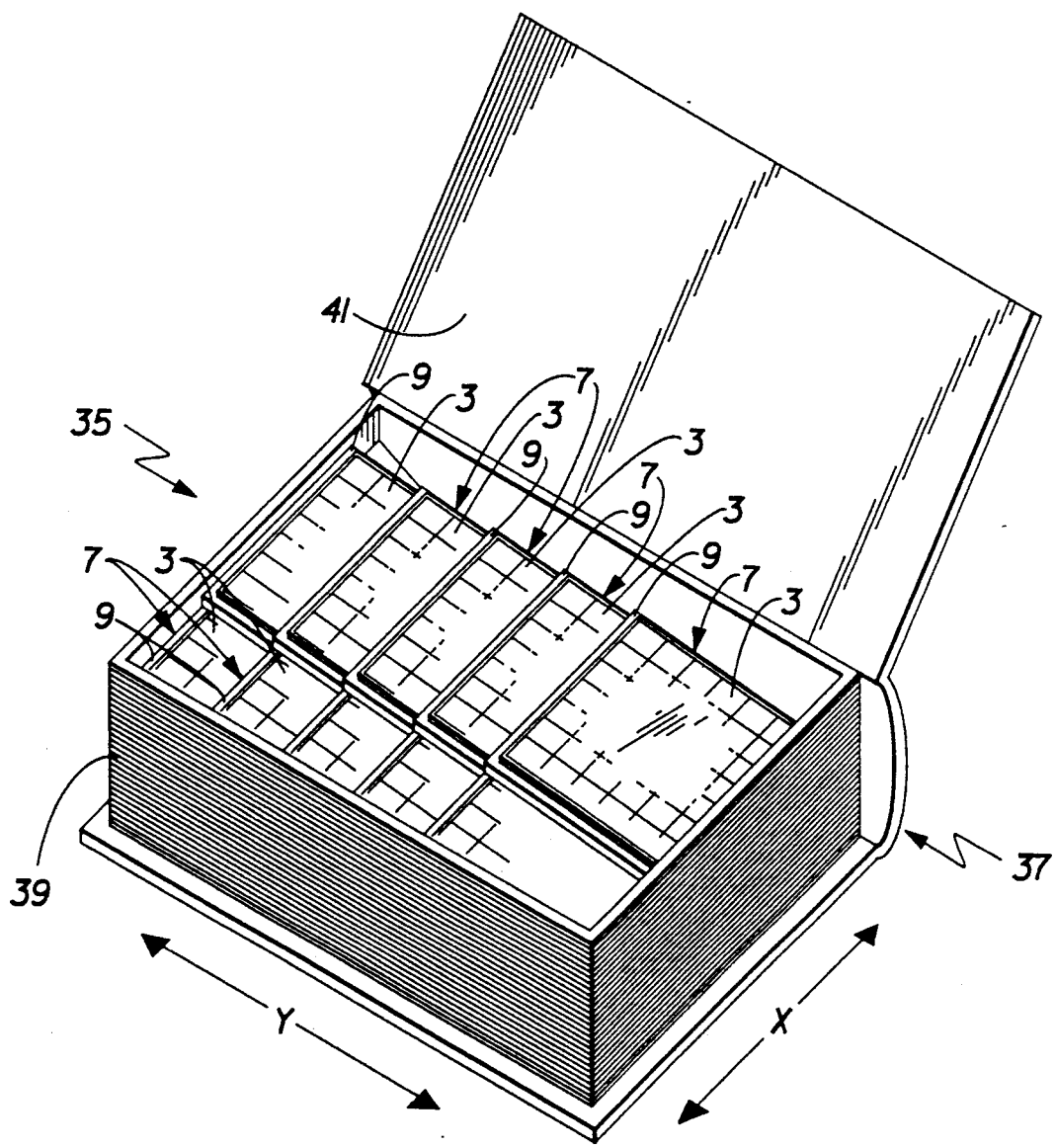
FIG. 4 is a perspective view of the storage box, showing how the display containers are positioned in X- and Y-directions in the box.

A storage assemblage 35 comprising a number of the display containers 7 and a book-like storage box 37 for the containers is shown in FIGS. 3 and 4. The box 37 has a main body portion 39 and an integrally hinged lid or cover 41. A form 43 inside the main body portion 39 has a number of parallel identical grooves 45 each of which is configured to receive some of the nests 25 of the respective containers 7 in a line to arrange the covers 9 and backs 19 of the containers whose nests are in the same groove overlapping in an X-direction and to arrange the covers and backs of the containers whose nests are in different grooves (next to one another) overlapping in a Y-direction perpendicular to the X-direction. See FIG. 4. The nests 25 of the respective containers 7 and the grooves 45 are complementarily curved for the grooves to support the nests for pivotal movement to flip the containers up to permit the index print sheets 3 to be viewed and down to store the containers in the main body portion 39.

The invention has been described with reference to a preferred embodiment. However, it will be appreciated that variations and modifications can be effected within the ordinary skill in the art without departing from the scope of the invention.

We claim:

1. A storage assemblage for cassettes each of which holds an image bearing medium having recorded images and for index print sheets each of which has printed pictures that match the images on the image bearing medium in one of the cassettes, said storage assemblage comprising:

display containers each of which includes a flat transparent cover and a flat back dimensioned to snugly hold an index print sheet between them with the pictures on the index print sheet visible through said cover, said back having a nest open at an inner side of the back to receive a cassette and projecting from an outer side of the back to hold the cassette out of the way of the index print sheet; and a storage box having at least two substantially parallel grooves each of which is configured to receive some of said nests of the respective containers in a line to arrange said covers and backs of the containers whose nests are in the same groove overlapping in an X-direction and to arrange the covers and backs of the containers whose nests are in different grooves overlapping in a Y-direction substantially perpendicular to the X direction.

2. A storage assemblage as recited in claim 1, wherein said nests of the respective containers and said grooves are complementary curved for the grooves to support the nests for pivotal movement to flip said containers up to permit the index print sheets to be viewed and down to store the containers in said box.

3. A storage assemblage as recited in claim 1, wherein said grooves extend lengthwise in the X-direction and are located substantially parallel to one another in the Y-direction.

* * * * *